3,354,240
REACTION PRODUCTS OF DIHYDROXYDIPHENYL COMPOUNDS WITH PHOSPHORUS SULFIDE OR PHOSPHORUS OXIDE AND AMINE SALTS THEREOF

Donald R. Pochowicz, Brookfield, Ill., assignor to Universal Oil Products Company, Des Plaines, Ill., a corporation of Delaware
No Drawing. Filed Apr. 6, 1964, Ser. No. 357,735
11 Claims. (Cl. 260—924)

This invention relates to a novel composition of matter comprising the reaction product of certain dihydroxydiphenyl compounds with certain phosphorus compounds, amine salts thereof, and to the use of these compounds as additives to organic substrates.

In a preferred embodiment, the novel compounds of the present invention are prepared by the reaction of a compound selected from the group consisting of dihydroxydiphenyl sulfide, dihydroxydiphenyl ether, dihydroxydiphenyl amine and dihydroxydiphenyl alkane with a compound selected from the group consisting of a sulfide of phosphorus and an oxide of phosphorus.

The exact structure of the reaction product has not been definitely established, but it is believed to be of the following formula:

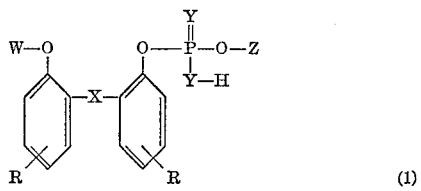

(1)

where R is selected from the group consisting of hydrogen and hydrocarbon, X is selected from the group consisting of sulfur, oxygen, nitrogen and hydrocarbon, Y is selected from the group consisting of sulfur and oxygen, W is selected from the group consisting of hydrogen, phosphate radical, dithiophosphate radical, diphenyl compound phosphate radical and diphenyl compound dithiophosphate radical, and Z is selected from the group consisting of hydrogen and diphenyl compound radical.

As hereinbefore set forth, the exact structure of the reaction product has not been definitely established. It is believed to be a mixture of monomer and polymer, and, accordingly, is believed to include one or more of the following types of compounds:

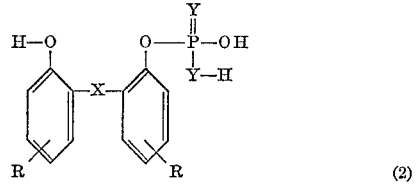

(2)

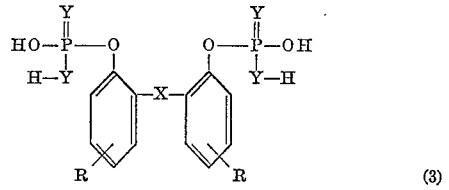

(3)

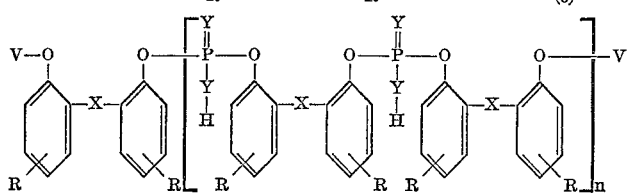

(4)

where $n$ is an integer of from 1 to 100 and even up to 1000, preferably from 1 to 10, V is selected from the group consisting of hydrogen, phosphate radical and dithiophosphate radical, and the other designations are the same as heretofore set forth.

In a preferred embodiment, R in the formulas hereinbefore set forth is an alkyl radical of from 1 to 20 or more carbon atoms and still more particularly of from 3 to about 12 carbon atoms. The alkyl group may be a primary, secondary or tertiary alkyl group, with the understanding that the secondary alkyl group will contain at least three carbon atoms and that the tertiary alkyl group will contain at least four carbon atoms. While only one R is indicated as being attached to a benzene ring, it is understood that two or more alkyl groups may be attached to the same benzene ring. In general, the alkyl radicals are preferred. However, it is understood that R also may be selected from the group consisting of cycloalkyl including cyclobutyl, cyclopentyl, cyclohexyl, cycloheptyl, cyclooctyl, cyclonoyl, cyclodecyl, etc., aryl including phenyl, naphthyl, anthracyl, etc., aralkyl including benzyl, phenylethyl, phenylpropyl, phenylbutyl, etc., alkaryl including tolyl, xylyl, ethylphenyl, diethylphenyl, propylphenyl, dipropylphenyl, butylphenyl, etc.

As hereinbefore set forth, the novel compounds of the present invention are prepared by the reaction of certain dihydroxydiphenyl compounds with certain phosphorus compounds. The dihydroxydiphenyl compound for use as a reactant in the present invention is illustrated by the following formula:

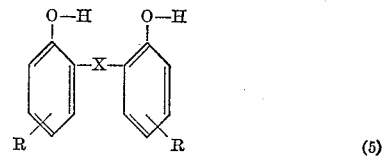

(5)

where R and X have the same designations as hereinbefore set forth.

A particularly preferred dihydroxydiphenyl compound is a dihydroxydiphenyl sulfide, in which X in Formula 5 is sulfur. It will be noted that the hydroxy groups are in the 2,2'-positions. Illustrative reactants include 2,2'-dihydroxydiphenyl sulfide and particularly 2,2'-dihydroxy-5,5'-dialkyldiphenyl sulfides including 2,2'-dihydroxy-5,5'-dimethyldiphenyl sulfide,
2,2'-dihydroxy-5,5'-diethyldiphenyl sulfide,
2,2'-dihydroxy-5,5'-dipropyldiphenyl sulfide,
2,2'-dihydroxy-5,5'-dibutyldiphenyl sulfide,
2,2'-dihydroxy-5,5'-dipentyldiphenyl sulfide,
2,2'-dihydroxy-5,5'-dihexyldiphenyl sulfide,
2,2'-dihydroxy-5,5'-diheptyldiphenyl sulfide,
2,2'-dihydroxy-5,5'-dioctyldiphenyl sulfide,
2,2'-dihydroxy-5,5'-dinonyldiphenyl sulfide,
2,2'-dihydroxy-5,5'-didecyldiphenyl sulfide,
2,2'-dihydroxy-5,5'-diundecyldiphenyl sulfide,
2,2'-dihydroxy-5,5'-didodecyldiphenyl sulfide,
2,2'-dihydroxy-5,5'-ditridecyldiphenyl sulfide,
2,2'-dihydroxy-5,5'-ditetradecyldiphenyl sulfide,
2,2'-dihydroxy-5,5'-dipentadecyldiphenyl sulfide,
2,2'-dihydroxy-5,5'-dihexadecyldiphenyl sulfide, 2,2'-dihydroxy-5,5'-diheptadecyldiphenyl sulfide,
2,2'-dihydroxy-5,5'-dioctadecyldiphenyl sulfide,
2,2'-dihydroxy-5,5'-dinonadecyldiphenyl sulfide,
2,2'-dihydroxy-5,5'-dieicosyldiphenyl sulfide, etc., and particularly these compounds in which the alkyl group contains at least three carbon atoms and is of secondary configuration. While the alkyl groups preferably are in the 5,5'-positions, it is understood that these may be in the 3,3'-, 4,4'-, 6,6'-, 3,4'-, 3,5'- and 3,6'-positions. Also, it is understood that two or more alkyl groups may be attached to the same benzene ring and that these may be in the 3,4-, 3,5-, 3,6-, 4,5-, 4,6- or 5,6-positions. Also, as hereinbefore set forth, R in the above formula may comprise cycloalkyl, aryl, aralkyl and/or alkaryl radicals.

In another embodiment the dihydroxydiphenyl compound is a dihydroxydiphenyl ether, in which X in Formula 5 is oxygen. Illustrative reactants in this embodiment include 2,2'-dihydroxydiphenyl ether and particularly 2,2'-dihydroxy-5,5'-dialkyldiphenyl ethers including 2,2'-dihydroxy-5,5'-dimethyldiphenyl ether,
2,2'-dihydroxy-5,5'-diethyldiphenyl ether,
2,2'-dihydroxy-5,5'-dipropyldiphenyl ether,
2,2'-dihydroxy-5,5'-dibutyldiphenyl ether,
2,2'-dihydroxy-5,5'-dipentyldiphenyl ether,
2,2'-dihydroxy-5,5'-dihexyldiphenyl ether,
2,2'-dihydroxy-5,5'-diheptyldiphenyl ether,
2,2'-dihydroxy-5,5'-dioctyldiphenyl ether,
2,2'-dihydroxy-5,5'-dinonyldiphenyl ether,
2,2'-dihydroxy-5,5'-didecyldiphenyl ether,
2,2'-dihydroxy-5,5'-diundecyldiphenyl ether,
2,2'-dihydroxy-5,5'-didodecyldiphenyl ether,
2,2'-dihydroxy-5,5'-ditridecyldiphenyl ether,
2,2'-dihydroxy-5,5'-ditetradecyldiphenyl ether,
2,2'-dihydroxy-5,5'-dipentadecyldiphenyl ether,
2,2'-dihydroxy-5,5'-dihexadecyldiphenyl ether,
2,2'-dihydroxy-5,5'-diheptadecyldiphenyl ether,
2,2'-dihydroxy-5,5'-dioctadecyldiphenyl ether,
2,2'-dihydroxy-5,5'-dinonadecyldiphenyl ether,
2,2'-dihydroxy-5,5'-dieicosyldiphenyl ether, etc., and particularly these compounds in which the alkyl group contains at least three carbon atoms and is of secondary configuration. While the alkly groups preferably are in the 5,5'-positions, it is understood that these may be in the 3,3'-, 4,4'-, 6,6'-, 3,4'-, 3,5'- and 3,6'-positions. Also, it is understood that two or more alkyl groups may be attached to the same benzene ring and that these may be in the 3,4-, 3,5-, 3,6-, 4,5-, 4,6- or 5,6-positions. Also, as hereinbefore set forth, R in the above formula may comprise cycloalkyl, aryl, aralkyl and/or alkaryl radicals.

In still another embodiment the dihydroxydiphenyl compound is a dihydroxydiphenyl amine in which X in Formula 5 is nitrogen and more particularly N—R in which R is hydrogen or hydrocarbon, the hydrocarbon being defined as hereinbefore set forth. Illustrative compounds include 2,2'-dihydroxydiphenyl amine and more particularly 2,2'-dihydroxy-5,5'-dialkyldiphenyl amines including 2,2'-dihydroxy-5,5'-dimethyldiphenyl amine,
2,2'-dihydroxy-5,5'-diethyldiphenyl amine,
2,2'-dihydroxy-5,5'-dipropyldiphenyl amine,
2,2'-dihydroxy-5,5'-dibutydiphenyl amine,
2,2'-dihydroxy-5,5'-dipentyldiphenyl amine,
2,2'-dihydroxy-5,5'-dihexyldiphenyl amine,
2,2'-dihydroxy-5,5'-diheptyldiphenyl amine,
2,2'-dihydroxy-5,5'-dioctyldiphenyl amine,
2,2'-dihydroxy-5,5'-dinonyldiphenyl amine,
2,2'-dihydroxy-5,5'-didecyldiphenyl amine,
2,2'-dihydroxy-5,5'-diundecyldiphenyl amine,
2,2'-dihydroxy-5,5'-didodecyldiphenyl amine,
2,2'-dihydroxy-5,5'-ditridecyldiphenyl amine,
2,2'-dihydroxy-5,5'-ditetradecyldiphenyl amine,
2,2'-dihydroxy-5,5'-dipentadecyldiphenyl amine,
2,2'-dihydroxy-5,5'-dihexadecyldiphenyl amine,
2,2'-dihydroxy-5,5'-diheptadecyldiphenyl amine,
2,2'-dihydroxy-5,5'-dioctadecyldiphenyl amine,
2,2'-dihydroxy-5,5'-dinonadecyldiphenyl amine,
2,2'-dihydroxy-5,5'-dieicosyldiphenyl amine, etc., and particularly these compounds in which the alkyl group contains at least three carbon atoms and is of secondary configuration. While the alkyl groups preferably are in the 5,5'-positions, it is understood that these may be in the 3,3'-, 4,4'-, 6,6'-, 3,4'-, 3,5'- and 3,6'-positions. Also, it is understood that two or more alkyl groups may be attached to the same benzene ring and that these may be in the 3,4-, 3,5-, 3,6-, 4,5-, 4,6- or 5,6-positions. Also, as hereinbefore set forth, R in the above formula may comprise cycloalkyl, aryl, aralkyl and/or alkaryl radicals.

In still another embodiment the dihydroxydiphenyl compound is a dihydroxydiphenyl alkane in which X in Formula 5 is an aliphatic radical. Illustrative reactants include 2,2'-dihydroxydiphenyl methane and more particularly 2,2'-dihydroxy-5,5'-dialkyldiphenyl methanes including 2,2'-dihydroxy-5,5'-dimethyldiphenyl methane,
2,2'-dihydroxy-5,5'-diethyldiphenyl methane,
2,2'-dihydroxy-5,5'-dipropyldiphenyl methane,
2,2'-dihydroxy-5,5'-dibutyldiphenyl methane,
2,2'-dihydroxy-5,5'-dipentyldiphenyl methane,
2,2'-dihydroxy-5,5'-dihexyldiphenyl methane,
2,2'-dihydroxy-5,5'-diheptyldiphenyl methane,
2,2'-dihydroxy-5,5'-dioctyldiphenyl methane,
2,2'-dihydroxy-5,5'-dinonyldiphenyl methane,
2,2'-dihydroxy-5,5'-didecyldiphenyl methane,
2,2'-dihydroxy-5,5'-diundecyldiphenyl methane,
2,2'-dihydroxy-5,5'-didodecyldiphenyl methane,
2,2'-dihydroxy-5,5'-ditridecyldiphenyl methane,
2,2'-dihydroxy-5,5'-ditetradecyldiphenyl methane,
2,2'-dihydroxy-5,5'-dipentadecyldiphenyl methane,
2,2'-dihydroxy-5,5'-dihexadecyldiphenyl methane,
2,2'-dihydroxy-5,5'-diheptadecyldiphenyl methane,
2,2'-dihydroxy-5,5'-dioctadecyldiphenyl methane,
2,2'-dihydroxy-5,5'-dinonadecyldiphenyl methane,
2,2'-dihydroxy-5,5'-dieicosyldiphenyl methane, etc.,
2,2'-dihydroxy-5,5'-dimethyldiphenyl ethane,
2,2'-dihydroxy-5,5'-diethyldiphenyl ethane,
2,2'-dihydroxy-5,5'-dipropyldiphenyl ethane,
2,2'-dihydroxy-5,5'-dibutyldiphenyl ethane,
2,2'-dihydroxy-5,5'-dipentyldiphenyl ethane,
2,2'-dihydroxy-5,5'-dihexyldiphenyl ethane,
2,2'-dihydroxy-5,5'-diheptyldiphenyl ethane,
2,2'-dihydroxy-5,5'-dioctyldiphenyl ethane,
2,2'-dihydroxy-5,5'-dinonyldiphenyl ethane,
2,2'-dihydroxy-5,5'-didecyldiphenyl ethane,
2,2'-dihydroxy-5,5'-diundecyldiphenyl ethane,
2,2'-dihydroxy-5,5'-didodecyldiphenyl ethane,
2,2'-dihydroxy-5,5'-ditridecyldiphenyl ethane,
2,2'-dihydroxy-5,5'-ditetradecyldiphenyl ethane,
2,2'-dihydroxy-5,5'-dipentadecyldiphenyl ethane,
2,2'-dihydroxy-5,5'-dihexadecyldiphenyl ethane,
2,2'-dihydroxy-5,5'-diheptadecyldiphenyl ethane,
2,2'-dihydroxy-5,5'-dioctadecyldiphenyl ethane,
2,2'-dihydroxy-5,5'-dinonadecyldiphenyl ethane,
2,2'-dihydroxy-5,5'-dieicosyldiphenyl ethane, etc.,
2,2'-dihydroxy-5,5'-dimethyldiphenyl propane,
2,2'-dihydroxy-5,5'-diethyldiphenyl propane,
2,2'-dihydroxy-5,5'-dipropyldiphenyl propane,
2,2'-dihydroxy-5,5'-dibutyldiphenyl propane,
2,2'-dihydroxy-5,5'-dipentyldiphenyl propane,
2,2'-dihydroxy-5,5'-dihexyldiphenyl propane,
2,2'-dihydroxy-5,5'-diheptyldiphenyl propane,
2,2'-dihydroxy-5,5'-dioctyldiphenyl propane,
2,2'-dihydroxy-5,5'-dinonyldiphenyl propane,
2,2'-dihydroxy-5,5'-didecyldiphenyl propane,
2,2'-dihydroxy-5,5'-diundecyldiphenyl propane,
2,2'-dihydroxy-5,5'-didodecyldiphenyl propane, 2,2'-dihydroxy-5,5'-ditridecyldiphenyl propane,
2,2'-dihydroxy-5,5'-ditetradecyldiphenyl propane,
2,2'-dihydroxy-5,5'-dipentadecyldiphenyl propane,
2,2'-dihydroxy-5,5'-dihexadecyldiphenyl propane,
2,2'-dihydroxy-5,5'-diheptadecyldiphenyl propane,
2,2'-dihydroxy-5,5'-dioctadecyldiphenyl propane,
2,2'-dihydroxy-5,5'-dinonadecyldiphenyl propane,
2,2'-dihydroxy-5,5'-dieicosyldiphenyl propane, etc.,
2,2'-dihydroxy-5,5'-dimethyldiphenyl butane,
2,2'-dihydroxy-5,5'-diethyldiphenyl butane,
2,2'-dihydroxy-5,5'-dipropyldiphenyl butane,
2,2'-dihydroxy-5,5'-dibutyldiphenyl butane,
2,2'-dihydroxy-5,5'-dipentyldiphenyl butane,
2,2'-dihydroxy-5,5'-dihexyldiphenyl butane,
2,2'-dihydroxy-5,5'-diheptyldiphenyl butane,
2,2'-dihydroxy-5,5'-dioctyldiphenyl butane,
2,2'-dihydroxy-5,5'-dinonyldiphenyl butane,
2,2'-dihydroxy-5,5'-didecyldiphenyl butane,
2,2'-dihydroxy-5,5'-diundecyldiphenyl butane,
2,2'-dihydroxy-5,5'-didodecyldiphenyl butane,
2,2'-dihydroxy-5,5'-ditridecyldiphenyl butane,
2,2'-dihydroxy-5,5'-ditetradecyldiphenyl butane,
2,2'-dihydroxy-5,5'-dipentadecyldiphenyl butane,
2,2'-dihydroxy-5,5'-dihexadecyldiphenyl butane,
2,2'-dihydroxy-5,5'-diheptadecyldiphenyl butane,
2,2'-dihydroxy-5,5'-dioctadecyldiphenyl butane,
2,2'-dihydroxy-5,5'-dinonadecyldiphenyl butane,
2,2'-dihydroxy-5,5'-dieicosyldiphenyl butane, etc., and similarly substituted compounds in which the alkane radical contains from 5 to 20 or more carbon atoms. The alkyl substituents preferably contain at least three carbon atoms and are of secondary configuration. While the alkyl groups preferably are in the 5,5'-positions, it is understood that these may be in the 3,3'-, 4,4'-, 6,6'-, 3,4'-, 3,5'- and 3,6'-positions. Also, it is understood that two or more alkyl groups may be attached to the same benzene ring and that these may be in the 3,4-, 3,5-, 3,6-, 4,5-, 4,6- or 5,6-positions. Also, as hereinbefore set forth, R in the above formula may comprise cycloalkyl, aryl, aralkyl and/or alkaryl radicals.

The dihydroxydiphenyl compound set forth above is reacted with a sulfide of phosphorus or an oxide of phosphorus. In the former embodiment, phosphorus pentasulfide is a preferred reactant. At the present time there are different schools of thought as to the structure of phosphorus pentasulfide. It is believed to be $P_2S_5$, but also has been expressed as $P_4S_{10}$. Various structures have been proposed including a polymeric cage-like configuration. Regardless of the exact structure of this compound, phosphorus pentasulfide is available commercially and is used for reaction with the oxyalkylenated hydroxyhydrocarbon in the manner herein set forth. In the interest of simplicity, phosphorus pentasulfide is also referred to in the present specifications as $P_2S_5$, with the understanding that this is intended to cover the phosphorus pentasulfide available commercially or prepared in any suitable manner. It is understood that other suitable sulfide of phosphorus may be used. The reaction preferably is effected using two mole proportions of the dihydroxydiphenyl compound per one mole proportion of $P_2S_5$, although when desired, from one-half to two mole proportions of the dihydroxydiphenyl compound may be used with one mole proportion of $P_2S_5$. However, when the sulfide of phosphorus contains only one phosphorus atom, these proportions become from one to four mole proprtins of the dihydroxydiphenyl compound per one mole proportion of the sulfide of phosphorus. It is understood that an excess of one reactant may be used when desired. The reaction is effected by heating the reactants to a temperature of above about 100° C., which temperature generally will not exceed about 250° C. However, it generally is preferred to effect the reaction in the presence of a solvent so that the reactants may be heated under refluxing conditions. The exact temperature will depend upon the specific solvent used. Any suitable solvent may be employed. Preferred solvents comprise aromatic hydrocarbons including benzene, toluene, xylene, ethylbenzene, cumene, etc., or mixtures thereof. In another embodiment the solvent may comprise a paraffinic hydrocarbon or mixtures thereof which preferably are selected from hexane, heptane, octane, nonane, decane, undecane, dodecane, etc. The reaction may be effected at atmospheric, subatmospheric or superatmospheric pressure up to 1000 pounds per square inch or more and for a time sufficient to effect substantially complete reaction, which time may range from 0.5 to 20 hours or more.

Hydrogen sulfide is formed in the above reaction and preferably is continuously removed from the reaction zone. After completion of the reaction, any excess $P_2S_5$ may be removed in any suitable manner including filtering to remove solvent and $P_2S_5$, if any, from the solid reaction product or by removing the solvent, etc., by distillation, preferably under vacuum. The product generally is recovered as a solid and may be utilized as such or either is recovered in admixture with the solvent used during its preparation or commingled with an extraneous solvent, the latter generally comprising an aromatic hydrocarbon, mixtures thereof or a mixture of aromatic and non-aromatic hydrocarbons.

In another embodiment the dihydroxydiphenyl compound is reacted with an oxide of phosphorus. Any suitable oxide of phosphorus may be used, phosphorus pentoxide being preferred. This reaction is effected in substantially the same manner as heretofore described for the reaction of the dihydroxydiphenyl compound with phosphorus pentasulfide, except that $H_2O$ will be formed instead of $H_2S$.

In still another embodiment the novel compound of the present invention comprises an amine salt of the product formed by the reaction of the dihydroxydiphenyl compound with an oxide or sulfide of phosphorus. Any suitable amine is used in forming the salt and preferably the amine contains from 2 to 50 carbon atoms or more and preferably from 8 to 20 carbon atoms. The amine may be a monoamine or polyamine. Preferred monoamines include octyl amine, nonyl amine, decyl amine, undecyl amine, dodecyl amine, tridecyl amine, tetradecyl amine, pentadecyl amine, hexadecyl amine, heptadecyl amine, octadecyl amine, nonadecyl amine, eicosyl amine, etc. The amines may be prepared from fatty acid derivatives and, thus, may comprise tallow amine, hydrogenated tallow amine, lauryl amine, stearyl amine, oleyl amine, linoleyl amine, coconut amine, soya amine, etc.

Of the polyamines, N-alkyl diaminoalkanes are preferred. A particularly preferred amine of this class comprises an N-alkyl-1,3-diaminopropane in which the alkyl group contains from about 8 to about 25 carbon atoms. A number of N-alkyl diaminoalkanes of this class are available commercially, such as "Duomeen T" and "Diam 26" in which the alkyl group is derived from tallow and contains from about 12 to about 20 carbon atoms per group and mostly 16 to 18 carbon atoms. Other N-alkyl-1,3-diaminopropanes may be prepared to contain any number of carbon atoms desired in the alkyl group and thus the alkyl group is selected from hexyl, heptyl, octyl, nonyl, decyl, undecyl, dodecyl, tridecyl, tetradecyl, pentadecyl, hexadecyl, heptadecyl, octadecyl, nonadecyl, eicosyl, etc.

While the N-alkyl-1,3-diaminopropanes are preferred, it is understood that other suitable N-alkyl diaminoalkanes may be employed. Illsutrative examples include N-alkyl-1,2-diaminoethane,
N-alkyl-1,2-diaminopropane,
N-alkyl-1,2-diaminobutane,
N-alkyl-1,3-diaminobutane,
N-alkyl-1,4-diaminobutane,
N-alkyl-1,2-diaminopentane,
N-alkyl-1,3-diaminopentane, N-alkyl-1,4-diaminopentane,
N-alkyl-1,5-diaminopentane,
N-alkyl-1,2-diaminohexane,
N-alkyl-1,3-diaminohexane,
N-alkyl-1,4-diaminohexane,
N-alkyl-1,5-diaminohexane,
N-alkyl-1,6-diaminohexane, etc.

Other polyamines include ethylenediamine,
propylenediamine,
butylenediamine,
pentylenediamine,
hexylenediamine,
heptylenediamine,
octylenediamine, etc.,
diethylenetriamine,
dipropylenetriamine,
dibutylenetriamine,
dipentylenetriamine,
dihexylenetriamine,
diheptylenetriamine,
dioctylenetriamine, etc.,
triethylenetetraamine,
tripropylenetetraamine,
tributylenetetraamine,
tripentylenetetraamine,
trihexylenetetraamine,
triheptylenetetraamine,
trioctylenetetraamine, etc.,
tetraethylenepentaamine,
tetrapropylenepentaamine,
tetrabutylenepentaamine,
tetrahexylenepentaamine,
tetraheptylenepentaamine,
tetraoctylenepentaamine, etc.,
pentaethylenehexaamine,
pentapropylenehexaamine,
pentabutylenehexaamine,
pentapentylenehexaamine,
pentahexylenehexaamine,
pentaheptylenehexaamine,
pentaoctylenehexaamine, etc.

In another embodiment the amine is an aromatic amine. Aromatic monoamines include aniline, toluidine, xylidine, etc., naphthylamine, anthracylamine, rosin amine, etc., as well as the N-mono- and N,N-di-alkylated aromatic amines in which the alkyl group or groups contain from 1 to 15 carbon atoms or more. Illustrative examples of such compounds include N-methylaniline, N,N-di-methylaniline, N-ethylaniline, N,N-di-ethylaniline, N - propylaniline, N,N - di-propylaniline, N - butylaniline, N,N-di-butylaniline, N-amylaniline, N,N-di-amylaniline, N - hexylaniline, N,N - dihexylaniline, N - heptylaniline, N,N-di-heptylaniline, N-octylaniline, N,N-di-octylaniline, N-nonylaniline, N,N-di-nonylaniline, N-decylaniline, N,N-di-decylaniline, N-undecylaniline, N,N-di-undecylaniline, N-dodecylaniline, N,N-didodecylaniline, etc., as well as the corresponding substituted toluidine, xylidine, naphthylamine, anthracylamine, etc.

The amine salt of the reaction product is prepared in any suitable manner and is readily prepared by slowly adding the amine to a solution of the reaction product with intimate stirring. When the amine is a solid, it may be heated to melt the same. The reaction is effected at any suitable temperature and preferably is as low as practical. The temperature will be within the range of from room temperature to about 100° C. The amine salt is used in a mole proportion of from about 0.5 to 2 or more mole proportions of amine per one mole proportion of reaction product.

The novel compounds of the present invention will have varied utility. In one embodiment the compound is used as an additive in plastic and serves to retard oxidative deterioration and/or ultraviolet light absorption. The plastics include polyolefins such as polyethylene, polypropylene, polybutylene, as well as copolymers of ethylene and propylene, ethylene and butylene and propylene and butylene, polystyrene, polyvinyl chloride plastics which are derived from monomers such as vinyl chloride, vinyl acetate, vinylidine chloride, etc., vinyl type resins including copolymers of vinyl chloride with acrylonitrile, alkyl acrylates, alkyl methacrylates, alkyl maleates, alkyl fumarates, etc., textile plastics including nylon, Perlon, Dacron, Orlon, Dynel, Acrilan, Saran, etc., phenol-formaldehyde resins, urea-formaldehyde resins, melamine, formaldehyde resins, polyurethane foams, polyacetals, etc. Rubber is composed of polymers of conjugated 1,3-dienes and may be either of natural or synthetic origin. Rubber undergoes deterioration due to oxygen and exposure to direct sunlight for extended periods of time.

In another embodiment the compounds of the present invention are used as an additive in lubricating oil which may be of natural or synthetic origin. The mineral oils include those of petroleum origin and are referred to as motor lubricating oil, railroad type lubricating oil, marine oil, transformer oil, turbine oil, differential oil, diesel lubricating oil, gear oil, cylinder oil, specialty products oil, etc. Other natural oils include those of animal, marine or vegetable origin.

The lubricating oils generally have a viscosity within the range of from 10 SUS at 100° F. to 1000 SUS at 210° F. (SAE viscosity numbers include the range from SAE 10 to SAE 160.) The petroleum oils are obtained from paraffinic, naphthenic, asphaltic or mixed base crudes. When highly paraffinic lubricating oils are used, a solubilizing agent also may be used.

Synthetic lubricating oils are of varied types including aliphatic esters, polyalkylene oxides, silicones, esters of phosphoric and silicic acids, highly fluorine-substituted hydrocarbons, etc. Of the aliphatic esters, di-(2-ethylhexyl) sebacate is being used on a comparatively large commercial scale. Other aliphatic esters include dialkyl azelates, dialkyl suberates, dialkyl pimelates, dialkyl adipates, dialkyl glutarates, etc. Specific examples of these esters include dihexyl azelate, di-(2-ethylhexyl) azelate, di-3,5,5-trimethylhexyl glutarate, di-3,5,5-trimethylpentyl glutarate, di-(2-ethylhexyl) pimelate, di-(2-ethylhexyl) adipate, triamyl tricarballylate, pentaerythritol tetracaproate, dipropylene glycol dipelargonate, 1,5-pentanediol-di-(2-ethylhexanonate), etc. The polyalkylene oxides include polyisopropylene oxide, polyisopropylene oxide diether, polyisopropylene oxide diester, etc. The silicones include methyl silicone, methylphenyl silicone, etc., and the silicates include, for example, tetraisooctyl silicate, etc. The highly fluorinated hydrocarbons include fluorinated oil, perfluorohydrocarbons, etc.

Additional synthetic lubricating oils include (1) neopentyl glycol esters, in which the ester group contains from three to twelve carbon atoms or more, and particularly neopentyl glycol propionates, neopentyl glycol butyrates, neopentyl glycol caproates, neopentyl glycol caprylates, neopentyl glycol pelargonates, etc., (2) trimethylol alkanes such trimethylol ethane, trimethylol propane, trimethylol butane, trimethylol pentane, trimethylol hexane, trimethylol heptane, trimethylol octane, trimethylol decane, trimethylol undecane, trimethylol dodecane, etc., as well as the esters thereof and particularly triesters in which the ester portions each contains from three to twelve carbon atoms and may be selected from those hereinbefore specifically set forth in connection with the discussion of the neopentyl glycol esters, and (3) tricresylphosphate, trioctylphosphate, trinonylphosphate, tridecylphosphate, as well as mixed aryl and alkyl phosphates, etc.

The present invention also is used in the stabilization of greases made by compositing one or more thickening agents with an oil of natural or synthetic origin. Metal base synthetic greases are further classified as lithium grease, sodium grease, calcium grease, barium grease, strontium grease, aluminum grease, etc. These greases are solid or semi-solid gels and, in general, are prepared by the addition to the lubricating oil of hydrocarbon soluble metal soaps or salts of higher fatty acids as, for example, lithium stearate, calcium stearate, aluminum naphthenate, etc. The grease may contain one or more thickening agents such as silica, carbon black, talc, organic modified Bentonite, etc., polyacrylates, amides, polyamides, aryl ureas, methyl N-n-octadecyl terephthalomate, etc. Another type of grease is prepared from oxidized petroleum wax, to which the saponifiable base is combined with the proper amount of the saponifying agent, and the resultant mixture is processed to produce a grease. Other types of greases in which the features of the present invention are usable include petroleum greases, whale grease, wool grease, etc., and those made from inedible fats, tallow, butcher's waste, etc.

Oils of lubricating viscosity also are used as transmission fluids, hydraulic fluids, industrial fluids, etc., cutting oils, rolling oils, soluble oils, drawing compounds, slushing oils, etc.

In addition to the use in plastics and lubricating oils, the novel compounds of the present invention may be used to prevent oxidative deterioration of other organic substrates including motor fuel, naphtha, diesel fuel, fuel oil, finger-print oil, adhesives, etc.

The concentration of reaction product or amine salt to be employed as an additive will depend upon the particular substrate in which it is to be used. In general, the additive is used in a concentration of from about 0.001% to about 25% by weight of the substrate and preferably within the range of from about 0.01% to about 5% by weight of the substrate. It is incorporated into the substrate in any suitable manner. When added to a liquid substrate, the additive, either as such or in solution in a suitable solvent, is added to the liquid substrate and intimately mixed to obtain uniform distribution within the substrate. When added to a solid, it can be incorporated in the substrate by conventional milling or in any other suitable manner.

It is understood that the additive of the present invention may be used along with other additives incorporated in the organic substrate. The other additives will depend upon the particular organic substrate. For example, in lubricating oil, the additional additives may comprise one or more of viscosity index improver, pour point depressor, anti-foam additive, detergent, corrosion inhibitor, additional antioxidant, etc. Preferred additional antioxidants are of the phenolic type and include tertiary-butylcatechol, 2,6-ditertiarybutyl-4-methylphenol, 2,4-dimethyl-6-tertiarybutylphenol, etc., 2-tertiarybutyl-4-methoxyphenol, 2-tertiarybutyl-4-ethoxyphenol, etc. When used in plastics, it may be used along with other inhibitors or other ultraviolet light stabilizers. The other inhibitors generally will be of the phenolic or amine type and may include phenyl-alpha-naphthylamine, phenyl-beta-naphthylamine, phenothiazine, Nonox WSP, Nonox Cl, dialkylated phenols, trialkylated phenols, Santonox R, Santowhite, alkyl-alkoxyphenols, 2246 and 425 (American Cyanamid), diphenyl-p-phenylenediamine, 1,1,3-tris-(2-methyl-4-hydroxy-5-t-butylphenyl)-butane, 703 (Ethyl Corporation), Salol (salicylic acid esters), p-octylphenylsalicylate, various phosgene alkylated phenol reaction products, various alkoxyalkyldihydroxybenzophenones, polyalkyldihydroxybenzophenones, tetrahydroxybenzophenones, 2,4,5-trihydroxybutyrophenone, etc. Other ultraviolet light stabilizers include nickel-bis-dithiocarbonates, nickel-bis-dihydroxypolyalkylphenol sulfides, dilauryl beta-mercaptodipropionate, dihydroxytetraalkyl sulfides, dihydroxytetraalkyl methanes, various trithiophosphites as trilaurylthiophosphite, dialkylphosphites, trialkylphosphites, high molecular weight nitriles, various Mannich bases, etc.

The following examples are introduced to illustrate further the novelty and utility of the present invention but not with the intention of unduly limiting the same.

*Example I*

The compound of this example was prepared by the reaction of 2,2'-dihydroxy-5,5'-dioctyldiphenyl sulfide with $P_2S_5$ as follows. 44.2 g. (0.10 mole) of 2,2'-dihydroxy-5,5'-dioctyldiphenyl sulfide, 11.43 g. (0.05 mole) of $P_2S_5$ and 200 g. of xylene were charged to a one liter flask and the mixture was heated to 120° C. All of the $P_2S_5$ went into solution, indicating that complete reaction occurred. Following completion of the reaction, the reaction mixture was heated to 150° C. under water pump vacuum to remove the solvent and to recover the reaction product as an opaque color stringy solid. Chemical analysis showed a phosphorus content of 5.46% and a sulfur content of 16.2%. The phosphorus and sulfur contents, calculated for the reaction product of one mole proportion of the dihydroxydiphenyl sulfide and one-half mole proportion of phosphorus pentasulfide, are 5.6% phosphorus and 17.90% sulfur.

Infra-red analysis of the product showed only a minor band in the (OH) region indicating a low concentration of the hydroxyl for the molecular weight of the sample. This appears to confirm the structures shown in Equations 1 through 4; namely that the reaction of the $P_2S_5$ is at the hydroxyl groups of the dihydroxydiphenyl sulfide. Furthermore, an osmometric molecular weight determination of the reaction product in 0.8% chloroform solution analyzed 640 molecular weight. The mono adduct has a calculated molecular weight of 536. Accordingly it is believed that the reaction product comprises a mixture of the mono adduct and of polymer formation.

*Example II*

The compound of this example is the product formed by the reaction of 2,2'-dihydroxy-5,5'-dibutylphenyl ether and phosphorus pentoxide. The reaction is effected by charging one mole proportion of 2,2'-dihydroxy-5,5'-dibutyldiphenyl ether and 200 g. of xylene into a reaction flask, heating the same to reflux temperature and adding thereto, in incremental proportions, 0.5 mole proportion phosphorus pentoxide. Refluxing is continued until the reaction goes to completion. Xylene solvent is removed by distillation under vacuum to leave a solid reaction product.

*Example III*

The reaction product of this example is prepared by refluxing 3 mole proportions of 2,2'-dihydroxy-5,5'-didecyldiphenyl amine, 1 mole proportion of $P_2S_5$ and 400 g. of xylene. Refluxing is continued until all of the $P_2S_5$ is consumed and the reaction mixture then is heated to 150° C. under vacuum to remove the xylene solvent and to leave a solid reaction product.

*Example IV*

In this example, 2,2'-dihydroxydiphenyl methane is reacted with $P_2S_5$. Two mole proportions of 2,2'-dihydroxydiphenyl methane, one mole proportion of $P_2S_5$ and xylene solvent are charged to a reaction zone and heated to, and maintained at, refluxing conditions until the reaction is completed. The xylene was employed in an amount to yield a final solution containing the reaction product in a concentration of 25% by weight. This solution is used as an additive composition for incorporating into a hydrocarbon oil.

*Example V*

The compound of this example is the N-tallow-1,3-diaminopropane salt of the reaction product prepared as described in Example I. The amine salt is prepared by mixing equal mole proportions of the N-tallow-1,3-diaminopropane and the reaction product of Example I in xylene solvent at room temperature with intimate stirring.

The xylene solvent is used in a concentration to form a final solution containing the amine salt in 50% by weight concentration.

Example VI

As hereinbefore set forth, the compounds of the present invention are effective as additives to retard oxidative deterioration of plastics. The plastic used in this example is a special batch of a commercial solid polyethylene. This special batch of solid polyethylene was obtained free of inhibitors in order that it may be used as a proper control sample to evaluate the effect of different inhibitors. The solid polyethylene is of the high density type and the inhibited product is marketed commercially under the trade name of Fortiflex. In one method, the solid polyethylene is evaluated in an Atlas type DL-TS Weather-Ometer. The polyethylene was milled in a two-roll heated mill of conventional commercial design and the additive was incorporated in the samples during the milling. The samples were pressed into sheets of 17 mil thickness and cut into plaques of 1⅜" x 1½". The plaques then were inserted into plastic holders, affixed onto a rotating drum and exposed to carbon arc rays at about 52° C. in the Weather-Ometer. Periodically samples of the polyethylene were subjected to infra-red analysis and the intensity of the carbonyl band at 1715 cm.$^{-1}$ was determined and expressed as the carbonyl number. The formation of carbonyl groups is an indication of deterioration of the polyethylene. Accordingly, a higher carbonyl number indicates increased deterioration.

A control sample of the polyethylene, without additive, reached a carbonyl number of over 700 within 500 hours. In contrast, another sample of the polyethylene containing 0.075% by weight of the reaction product of Example I reached a carbonyl number of only 376 after 920 hours.

Example VII

Evaluations similar to those described in Example VI were made in a solid polypropylene. A control sample of the solid polypropylene, not containing an additive, reached a carbonyl number of about 750 within 50 hours of exposure in the Weather-Ometer. In contrast, a sample of the same polypropylene containing 1% by weight of the reaction product of Example I and 0.15% by weight of butylated hydroxytoluene developed a carbonyl number of 620 after 575 hours exposure in the Weather-Ometer. Evaluations made using the butylated hydroxytoluene as the only additive showed that this material had substantially no effect in preventing carbonyl formation in polyolefins.

Example VIII

The reaction product of Example I also was evaluated in another sample of the polyethylene described in Example VI by a different method. In this method, the different samples of polyethylene were evaluated in a method similar to that described by Hawkins, Hansen, Matreyek and Winslow in Rubber Chemistry and Technology, October-November 1959, pages 1164–1170, except that an electrically heated aluminum block rather than an oven was used to maintain the desired temperature. The oxygen absorption of the sample was determined manometrically rather than volumetrically. In this method samples of the polyethylene, weighing about 0.5 g. each, are placed in separate 8 mm. glass tubes and the tubes then are inserted into horizontal rows of openings located concentrically around the heater. The temperature is maintained at about 140° C. The glass tubing also is packed with glass wool and molecular sieves to absorb the gases. Each of the glass tubes is connected to individual manometers containing mercury and the differential pressure is periodically determined. The induction period is taken as the number of hours required to reach a pressure differential of 20 cm. Hg.

When evaluated in this manner, a control sample of the polyethylene, not containing an additive, reached the Induction Period in less than 11 hours. In contrast, a sample of the polyethylene containing 1% by weight of the reaction product of Example I did not reach the Induction Period until after 1091 hours of exposure in this manner.

Example IX

The polypropylene described in Example VII also was evaluated in the method described in Example VIII. A control sample of the polypropylene reached the Induction Period within three hours. In contrast, a sample of the polypropylene containing 0.15% by weight of the reaction product of Example I did not reach the Induction Period until after 967 hours. Another sample of the polypropylene containing 1% by weight of the reaction product of Example I and 0.15% of butylated hydroxytoluene had an Induction Period of over 1400 hours.

Example X

As hereinbefore set forth, the compounds of the present invention also possess utility as additives in lubricating oils. One method of evaluating lubricating oils is by the Falex machine. This procedure is described in detail in a book entitled "Lubricant Testing" authored by E. G. Ellis and published by Scientific Publications (Great Britain) Limited, 1953, pages 150–154. Briefly, the Falex machine consists of a rotating pin which runs between two V shape bearings which are spring loaded against the pin and provided with means for varying the load. The oil to be tested is poured into a metal trough in which the pin and bearings are partly submerged. The machine was operated for five minutes each at 250 and 500 pound loads and then forty-five minutes at 750 pound load and, in some evaluations, up to 1000 pound load. The data collected includes the temperature of the oil at each of the loads and the torque in pounds per square inch at each load, as well as the wear which is determined by a ratchet wheel arrangement in which the teeth are advanced in order to maintain the desired load. Each tooth is equivalent to approximately 0.000022 inches. Preferred additives are those which impart low temperature, low torque and low wear to the oil.

In another series of tests the machine was operated for five minutes at each load from 250 pounds to seizure at 250 pound increments. The maximum load and the time in minutes at this load to seizure are reported, as well as the temperature of the oil. In this case the higher temperature is preferred because it means that the oil is operating satisfactorily at a higher temperature.

These evaluations were made using a mineral lubricating oil marketed commercially as "Carnes 340 White Oil." Typical specifications of this oil include the following:

| | |
|---|---|
| Distillation range, ° F. | 740–975 |
| Specific gravity at 60° F. | 0.8836 |
| Viscosity: | |
|     At 100° F. | 360 |
|     At 210° F. | 52.2 |
| Flash point, COC, ° F. | 440 |
| Refractive index at 68° F. | 1.4805 |
| Saybolt color | +30 |

Run No. 1 in the following table is a run made using the white oil not containing an additive and thus is the control or blank run.

Run No. 2 is a run made using another sample of the white oil to which had been added 2% by weight of the reaction product of Example I.

TABLE I

| Run No. | Temperature, °F. | | | Torque, lbs. | | | Wear, Teeth | | | Seizure Conditions | | |
|---|---|---|---|---|---|---|---|---|---|---|---|---|
| | 250 | 500 | 750 | 250 | 500 | 750 | 250 | 500 | 750 | Load | Time | Temperature, °F. |
| 1 | 172 | 350-S | -------- | 5-6 | 30-S | -------- | 0 | S | -------- | 425 | 0.1 | 275 |
| 2 | 173 | 274 | 527 | 4-6 | 10-14 | 17-90 | 0 | 0 | 1 | 1,000 | 0.38 | 735 |

S—Seizure.

From the data in the above table, it will be seen that the control sample underwent seizure at a load of 425 pounds. In contrast, the white oil containing the additive of the present invention did not undergo seizure until a load of 1000 pounds.

Example XI

The N-tallow-1,3-diaminopropane salt of the reaction product of Example I, prepared as described in Example V, is used as an additive in dioctyl sebacate synthetic lubricating oil marketed under the trade name of Plexol 201. One percent by weight of the amine salt is intimately mixed in the dioctyl sebacate and this serves to improve the properties of the lubricating oil.

Example XII

The reaction product of 2,2'-dihydroxy-5,5'-didecyldiphenyl amine, prepared as described in Example III, is used as an additive in grease. The additive is incorporated in a commercial Mid-Continent lubricating oil having an S.A.E. viscosity of 20. Approximately 92% of the lubricating oil then is mixed with approximately 8% by weight of lithium stearate. The mixture is heated to about 450° F., with constant agitation. Subsequently, the grease is cooled, while agitating, to approximately 250° F., and then the grease is further cooled slowly to room temperature.

The stability of the grease is tested in accordance with ASTM D-942 method, in which method a sample of the grease is placed in a bomb and maintained at a temperature of 250° F. Oxygen is charged to the bomb, and the time required for a drop of five pounds pressure is taken as the Induction Period. A sample of the grease without additive will reach the Induction Period in about eight hours. On the other hand, a sample of the grease containing 0.5% by weight of the additive of the present invention will not reach the Induction Period for more than 100 hours.

I claim as my invention:

1. Aliphatic or aromatic monoamine or polyamine salt of the reaction product, formed at a temperature within the range of from about 100° to about 250° C., of from one to four mole proportions of a compound selected from the group consisting of 2,2'-dihydroxydiphenyl sulfide, 2,2'-dihydroxydiphenyl ether, 2,2'-dihydroxydiphenyl amine and 2,2' dihydroxydiphenyl alkane with one mole proportion of phosphorus pentasulfide or phosphorus pentoxide.

2. The reaction product, formed at a temperature within the range of from about 100° to about 250° C., of from one to four mole proportions of a compound selected from the group consisting of 2,2'-dihydroxydiphenyl sulfide, 2,2'-dihydroxydiphenyl ether and 2,2'-dihydroxydiphenyl amine with one mole proportion of a compound selected from the group consisting of phosphorus pentasulfide and phosphorus pentoxide.

3. The reaction product, formed at a temperature within the range of from about 100° to about 250°C., of from one-half to two mole proportions of a 2,2'-dihydroxydiphenyl sulfide with one mole proportion of phosphorus pentasulfide.

4. The reaction product, formed at a temperature within the range of from about 100° to about 250° C., of from one-half to two mole proportions of 2,2'-dihydroxy-5,5'-dialkyldiphenyl sulfide in which each alkyl group contains from 1 to 20 carbon atoms with one mole proportion of phosphorus pentasulfide.

5. The reaction product, formed at a temperature within the range of from about 100° to about 250° C., of from one-half to two mole proportions of 2,2'-dihydroxy-5,5'-dioctyldiphenyl sulfide with one mole proportion of phosphorus pentasulfide.

6. N-tallow-1,3-diaminopropane salt of the reaction product prepared as described in claim 5.

7. The reaction product, formed at a temperature within the range of from about 100° to about 250° C., of from one-half to two mole proportions of 2,2'-dihydroxy-5,5'-dialkyldiphenyl sulfide in which each alkyl group contains from 1 to 20 carbon atoms with one mole proportion of phosphorus pentoxide.

8. The reaction product, formed at a temperature within the range of from about 100° to about 250° C., of from one-half to two mole proportions of 2,2'-dihydroxy-5,5'-dialkyldiphenyl ether in which each alkyl group contains from 1 to 20 carbon atoms with one mole proportion of phosphorus pentasulfide.

9. The reaction product, formed at a temperature within the range of from about 100° to about 250° C., of from one-half to two mole proportions of 2,2'-dihydroxy-5,5'-dialkyldiphenyl amine in which each alkyl group contains from 1 to 20 carbon atoms with one mole proportion of phosphorus pentasulfide.

10. The reaction product, formed at a temperature within the range of from about 100° to about 250° C., of from one-half to two mole proportions of a 2,2'-dihydroxydiphenyl ether with one mole proportion of phosphorus pentasulfide or phosphorus pentoxide.

11. The reaction product, formed at a temperature within the range of from about 100° to about 250° C., of from one-half to two mole proportions of a 2,2'-dihydroxydiphenyl amine with one mole proportion of phosphorus pentasulfide or phosphorus pentoxide.

References Cited

UNITED STATES PATENTS 2,395,935    3/1946    Miescher et al. _____ 260—930

CHARLES B. PARKER, *Primary Examiner.*

A. H. SUTTO, *Assistant Examiner.*